United States Patent [19]

Quackenbush

[11] Patent Number: 4,876,140

[45] Date of Patent: Oct. 24, 1989

[54] LAMINATE CONDUCTING PLASTIC

[75] Inventor: John Quackenbush, Hoover, Ala.

[73] Assignee: FBK International Corporation, Birmingham, Ala.

[21] Appl. No.: 66,617

[22] Filed: Jun. 24, 1987

[51] Int. Cl.⁴ .......................... B32B 5/16; H01G 4/08
[52] U.S. Cl. ................................. 428/216; 428/323;
428/408; 428/900; 428/921; 428/922; 361/305;
361/323; 264/176.1; 425/6; 425/113
[58] Field of Search ............... 428/323, 216, 408, 900,
428/921, 922

[56] References Cited

U.S. PATENT DOCUMENTS 3,049,651  8/1962  Adelson et al. .
3,689,810  9/1972  Walles .
3,978,378  8/1976  Tigner et al. .
4,283,453  8/1981  Siefried .
4,603,073  7/1986  Renalls et al. ........................ 428/323

Primary Examiner—P. C. Ives
Attorney, Agent, or Firm—Stanger, Michaelson, Reynolds, Spivak & Tobia

[57] ABSTRACT

A layer of conductive plastic material can be made to exhibit relatively high conductivity with a relatively small amount of electrically conducting particles included in it if the layer is extruded in a lamellate form. Particularly, sublayers having thicknesses of the size of the conducting particles or less being the randomly distributed particles in one sublayer into close proximity with those in adjacent sublayers. Consequently, relatively short conducting paths through the layer are provided. The laminate layer is formed by an extrusion die with a plurality of dividers adapted to divide the extrudate into sublayer prior to recombination for the extrusion of the final layer. The laminate layer can be coextruded with electrically insulating layers to fabricate electrical components such as capacitors.

12 Claims, 3 Drawing Sheets

U.S. Patent   Oct. 24, 1989   Sheet 3 of 3   4,876,140 though, as any reference to the prior art will reveal, and the like, the embrittlement and cost as well as uniformity problems just dicussed are familiar.

LAMINATE CONDUCTING PLASTIC

FIELD OF THE INVENTION

This invention relates to electrically conductive plastic materials and more particularly to such materials adaptable for extrusion into layers.

BACKGROUND OF THE INVENTION

Electrically conductive plastic materials are well known in the art. It is known, for example, that non-conductive or poorly conductive resinous materials such as organic polymers are rendered highly conductive by, for example, including a finely divided carbon or, alternatively, a copper-containing solid and a salt such as zinc chloride. Volume resistivities as low as $10^{-3}$ ohm-cm are achieved in this manner. It is also well known that such compositions can be extruded into thin layers which are useful as electrodes or capacitors and like articles in which electroconductivity is required.

The conductivity of such materials is a function of the amount of conducting particles included in it. Unfortunately, the greater the amount of conducting particles, the more brittle the resulting material. At present, unacceptable embrittlement occurs with amounts of conducting particles insufficient to produce conductivity levels high enough for many commercial applications.

On the other hand, the cost of conductive plastics is a function of the amount of conducting particles included. Thus, conductive plastics of a desired conductivity level would be less expensive, and thus suitable for a greater number of commercial applications, if the desired conductivity level could be achieved with relatively few conducting particles.

BRIEF DESCRIPTION OF AN ILLUSTRATIVE EMBODIMENT OF THIS INVENTION

This invention is based on the recognition that the conductivity exhibited by a conductive plastic is a strong function of the physical placement of the conducting particles in the plastic material. Thus, it has been found that by extruding layers of conductive plastic material from an extrudate including a specified amount of conducting material in it, a relatively higher conductivity is achieved if the conductive plastic is extruded as a composite laminate layer rather than as a single layer.

The laminate layer is produced, for example, by extruding the extrudate through an extension die which includes a "melt flow enhancer" which divides the extrudate into several layers before recombining the extrudate into a laminate layer of the desired thickness.

The extrusion of conducting plastics as a laminate layer rather than a single layer is thought to produce increased conductivity by bringing the conducting particles in the sublayers into closer proximity with particles in adjacent sublayers. It is known, for example, that electrically conductive plastics include electrically conducting material such as carbon particles which are randomly distributed in them. Any electrically conducting paths through the material follow paths including a sequence of particles as well as plastic between them and thus do not follow straight lines. Current carrying capacity is reduced primarily by the amount of plastic traversed as a result.

Current carrying capacity is increased by placing the conducting particles in closer proximity to one another. Prior art attempts to increase conductivity required increasingly smaller particle size and greater amounts of conducting particles. Unacceptable loss of strength and increased cost resulted as mentioned above. By extruding the conducting plastic in a multiple layer form, not only does each sublayer include a random distribution of conducting particles, but those particles are in close proximity to the randomly distributed particles in the adjacent layers. Conducting paths through the resulting laminate layer can be formed not only in a single sublayer, but via particles in adjacent sublayers.

It is easy to visualize a random distribution of conducting particles in sublayers which have thicknesses about equal to the size of the conducting particles or less. Clearly, particles in adjacent sublayers are in close proximity, spaced apart distances which can be made of the order of the spacings between particles in a single sublayer. For sublayers having thicknesses of less than the size of the conducting particles, those particles are flattened as well as elongated in the direction of the extrudate flow. Test results show that significantly higher conductivities can be achieved with a specified extrudate starting material if the desired layer is extruded as a laminate structure. Test results also have confirmed that acceptable levels of conductivity can be achieved with relatively little conducting material if the tested conducting plastic layer is extruded in a laminate form. Conductive plastic laminate layers extruded in accordance with the principles of this invention have exhibited higher conductivities than have ever been achieved with conducting plastics. Still, the resulting layers have perfectly acceptable strengths for commercial use.

DETAILED DESCRIPTION

Figure 1:
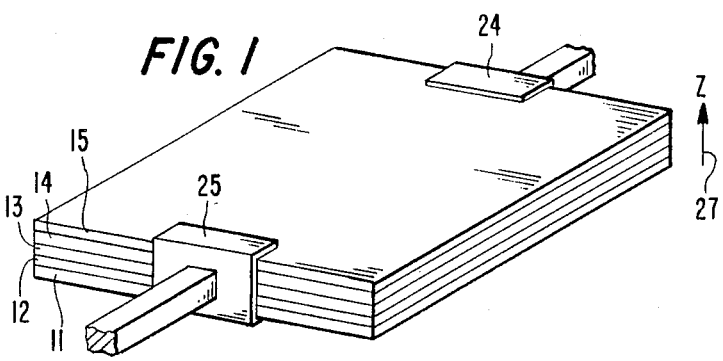
FIG. 1 is a schematic representation of a lamellate electrically-conductive plastic layer in accordance with the principles of this invention.

FIG. 1 shows an extruded conductive plastic layer 10 including a plurality of sublayers 11, 12, ... 15 in accordance with the principles of this invention. A typical extrudate comprises a thermoplastic or thermoset resin such as, for example, Union Carbide (TM)4055 Conductive Carbon Acrylic Resin having a density of 1.01. The layer 10 typically has a thickness of ten thousandths of an inch and includes a plurality of sublayers simultaneously extruded. Each of the sublayers, five in the representative embodiment, has a thickness of two thousandths (0.002) of an inch.

Figure 2:
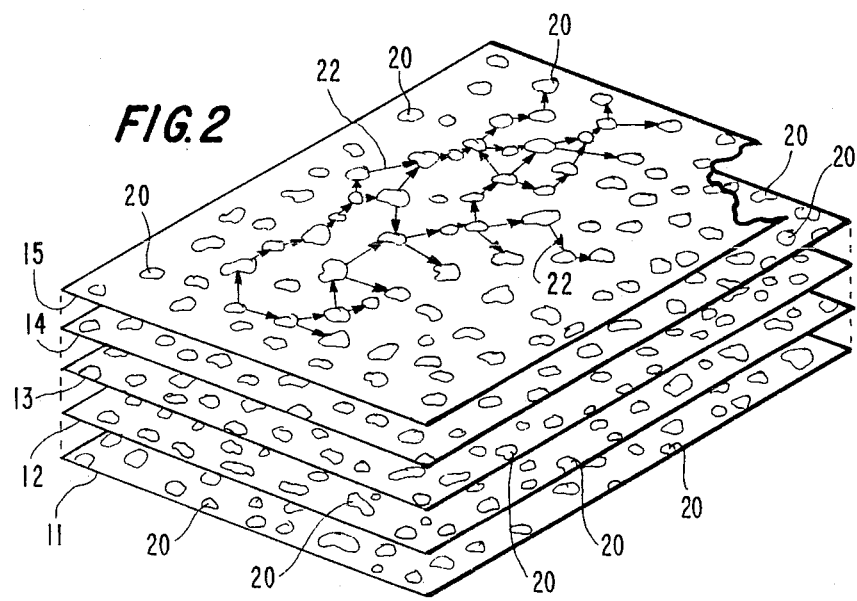
FIG. 2 is an enlarged, exploded view, partially cut away, of the layer of FIG. 1.

Each of the sublayers also include conductive particles. FIG. 2 shows sublayers 11 through 15 spaced apart, with sublayer 15 partially cut away. The conductive particles are represented by free forms 20. Forms 20 are distributed randomly through each of the sublayers, any current path formed in layer 10 including a series of the particles. Of course, the resistance to current flow in any such path is determined to a large extent by the spacings between conducting particles. That spacing, in turn, is determined to a large extent by the amount of conducting particles in the material. That amount is limited by the degree of embrittlement which can be tolerated.

The maximum amount of conducting particles in commercially available bulk conductive plastic material today is 75% to 90% by volume. Such material when extruded into a layer exhibits a maximum conductivity of >50,000 ohm cm. That same material when extruded into a layer of like thickness but including the sublayer exhibits a conductivity of >5,000,000 ohm cm, two orders of magnitude greater than achieved in the absence of the sublayers. It is submitted that the laminate structure of sublayers in a conductive plastic extruded layer not only is a radical departure from prior art thinking but leads to a surprising and commercially valuable result.

The difference in conductivity is explained in connection with FIGS. 2 and 3. The conducting particles distributed randomly in each sublayer provide paths for current in layer 10. The current paths are indicated by arrows 22 in layer 15 of FIG. 2. Thus, the conductivity of the layer 10 can be measured by impressing a voltage between terminals represented at 24 and 25 of FIG. 1. In a conductive plastic layer including sublayers as shown in FIGS. 1 and 2, such paths are provided not only within each of the sublayers, but the current paths so provided have an opportunity to include particles in adjacent sublayers. The sublayers thus provide a control over the distribution of conducting particles in the Z direction as indicated by arrow 27 of FIG. 1 to foster the inclusion of particles in adjacent sublayers.

Figure 3:
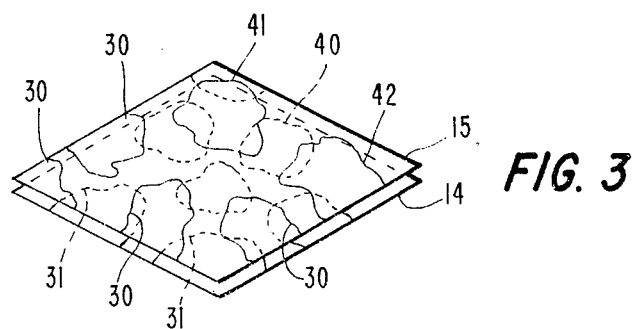
FIG. 3 is an imaginary square unit area of two sublayers of the layer of FIG. 1 showing conductive particles in each.
Figure 4:
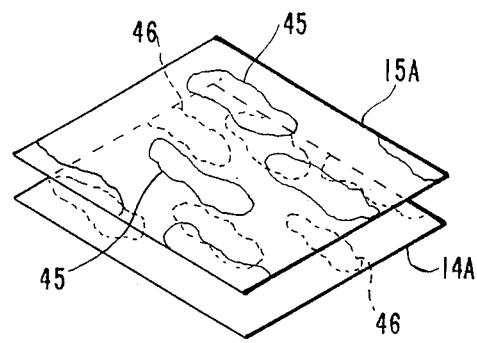
FIG. 4 is an imaginary square unit area of two sublayers of the layer of FIG. 1 where the sublayers therein are extruded at thicknesses of less than the size of the included conductive particles.

FIG. 3 shows an enlarged, imaginary unit area of two adjacent sublayers. Conducting particles in sublayer 15 are shown as forms 30 enclosed by solid lines. Conducting particles in sublayer 14 are represented as forms 31 enclosed by broken lines. Given a random distribution of conducting particles in each layer, it is clear that the particles in one sublayer will not align with those in the other. Consequently, the particles in one sublayer frequently will be positioned to bridge the space between consecutive particles in a current path of the adjacent sublayer. Thus, particle 40 in sublayer 14 is positioned to bridge consecutive particles 41 and 42 of layer 15 in FIG. 3. It is easy to visualize, particularly when the sublayers are of a thickness of the particle size or less, that spacings between particles in adjacent sublayers are shorter than spacings between particles in the same sublayer and the particles become elongated in the direction of extrusion flow. The elongated particles are indicated at 45 and 46 for sublayers 15A and 14A analogous to sublayers 15 and 14 of FIG. 1, respectively.

Studies were conducted with thermoplastic formulation with carbon black content varying from twenty-six to thirty-four percent by volume. The extrudate was extruded through a melt flow enhancer which extruded a layer 10 with a plurality of between three and fifty sublayers. The same starting material also was extruded in a single layer form common to the prior art as a reference. The layer extruded in accordance with the principles of the present invention exhibited much higher conductivity (140 vs. 240 ohm/sq). The tests also show that as the carbon content was lowered, an even more significant conductivity enhancement occurred (680 vs. 2500 ohm/sq). Volume resistivities, measured at room temperature and 90° C. over a twelve-week period followed the same trends. The amount of carbon could be reduced by ten to thirty percent to achieve the desired conductivity (<50,000 ohm-cm) for power cable applications, thus reducing cost while improving strength. The laminate conducting layers are found not only to exhibit improved tensile strength and dimensional stability even at elevated temperatures but also have been found to exhibit constant conductivity regardless of direction across the layer.

Figure 5:
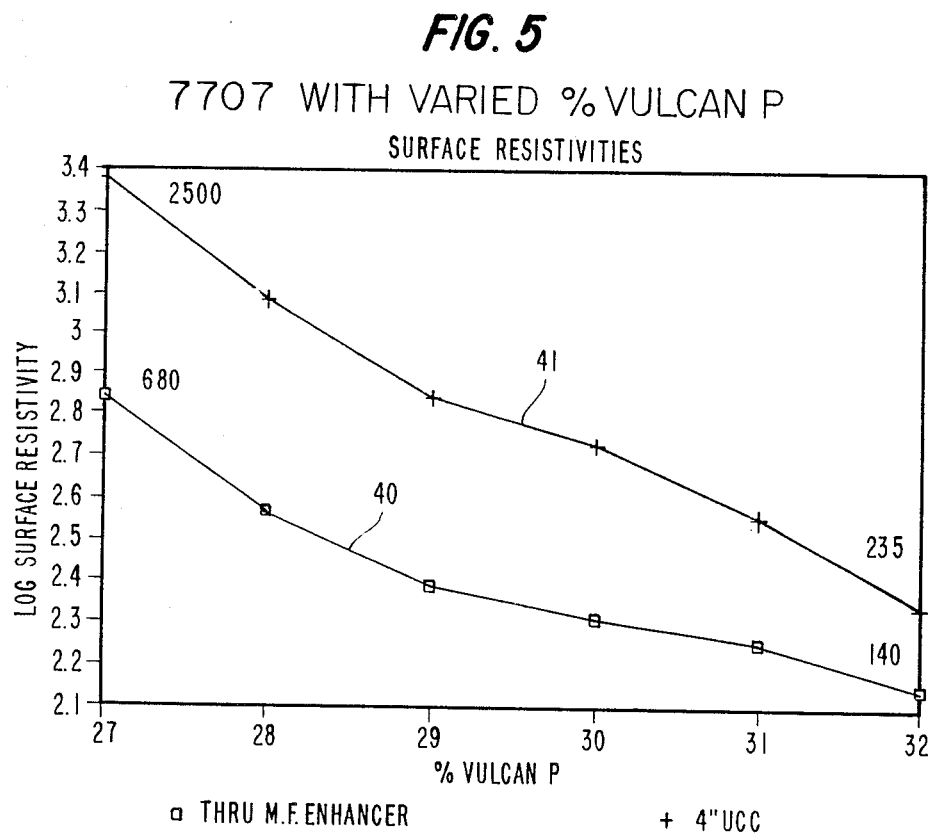
FIGS. 5 and 6 are graphs of surface resistivity versus percent conducting particles in thermoplastic resins.

FIG. 5 shows a graph plotting the log of surface resistivity of ethylene vinyl acetate (7702) with various percentages of carbon black (Vulcan P) for the materials extruded through a melt flow enhancer (line 40) and through a prior art extrude (line 41). It is clear that significant improvement results.

Figure 6:
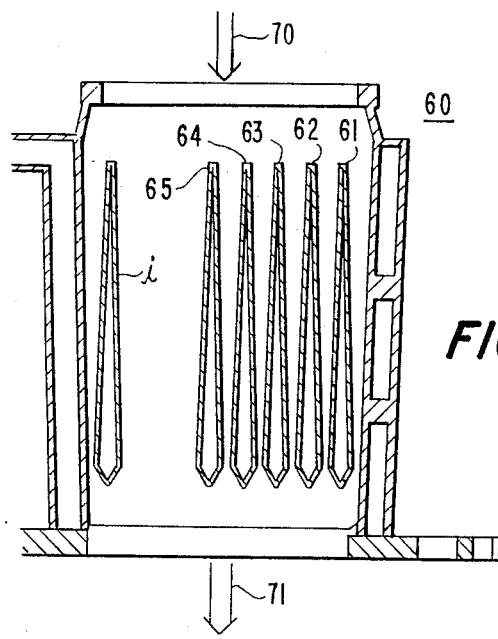

FIG. 6 shows a melt flow enhancer 60 adapted to cooperate with a conventional extrusion die to provide multiple layer extrusions by dividing the melt stream driving the melt phase and rejoining the divided streams into a layered structure. To this end, the enhancer includes a plurality of dividers conveniently of a wing foil form in cross section, to divide the extrudate in a manner to avoid turbulence. The dividers 61, 62, 63, 64, 65 ---i are arranged outside the path of movement of an extrudate introduced at the input end as indicated by double arrow 70 and exiting the output end of the enhancer as indicated by double arrow 71. The input opening in one specific embodiment was 1.5 inches, the output opening was 0.035" and the dividers were 1.250" long, 0.375" wide at the maximum, 0.030" wide, and spaced apart 0.020". The resulting conducting plastic layer had a total thickness of 0.035" with 7 sublayers each about 0.005" thick. The layer exhibited a conductivity of 10–5 surface volume resistivity as compared to a conductivity of 10–20 exhibited by a single layer made by prior art techniques with the same starting material but without the sublayer structure. The conducting particles in the starting material had sizes varying from 1.2 microns to 0.5 microns.

Figure 7:
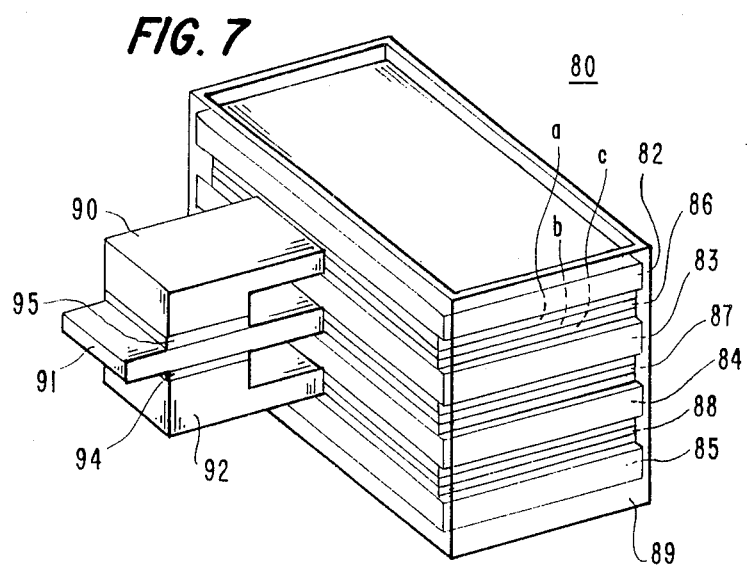
FIG. 7 is a schematic representation of a portion of a melt flow enhancer adapted for extruding a laminate, conducting plastic layer in accordance with the principles of this invention.

Conducting plastic layers having a laminate sublayer structure in accordance with the principles of this invention are particularly desirable for use in accordance with the aspects of this invention in a variety of electrical devices. FIG. 7 shows a capacitor 80 as representative of such devices. The capacitor is composed of insulating layers 82, 83, 84 and 85 alternating with electrically conducting layers 86, 87 and 88. Each of layers 86, 87, and 88 is indicated to have a structure of sublayers designated a, b, and c for layer 86 only. The capacitor includes an outer housing 89 (transparent) and an electrical plug with its three sections 90, 91, and 92 separated by insulating gaskets 94 and 95. The gasket may comprise a phenalic liner (a linen-like board) or glass. The capacitor, when charged electrically, provides a charge store which may be drained off via any suitable voltage regulating device. The use of a conducting plastic laminate in accordance with this invention provides a capacitor of relatively small dimension exhibiting greatly increased capacitance.

In the manufacture of electrical components such as batteries or capacitors, it is advantageous to coextrude layers of electrically insulating materials at the same time the laminate electrically conductive layer is extruded. Insulating materials are coextruded in a well understood manner by introducing the insulating material at a second input not shown. Also, conductive plastics with conductivities equivalent to that of aluminum can be made with the technique disclosed herein. Such laminate layers can be coextruded in a tube with a nontoxic overlayer to provide a catheter with one or more radially and longitudinally positioned electrically conductive path ways provided for computer monitoring of diffusion therapy administered through the tube.

The invention has been described in terms of a laminate conductive plastic adapted to provide relatively high electrical conductivity. It is to be understood that t e division of an extrudate melt stream in the melt phase into a plurality of layers and the rejoining of the resulting sublayers into a laminate structure is useful also when particles other than electrically conductive particles are used either in addition to or as a substitute for the conductive particles. Thus, for example, colorants such as organic pigments, antistatic agents, flame retardants and lubricants may be used with or without conductive particles to produce desirable commercial products with properties improved by the use of the layering techniques of the present invention. Further, magnetic particles may be used to provide improved "plastic" magnets.

The following list shows classes of includable particles and examples of such materials.

Materials Compoundable With Extrudable Plastic

Antioxidants
    Goodsite 3125 (B. F. Goodrich)
    Ethanox 702 (Ethyl)
    Bisphenol A (Shell)
Colorants
    Ultramarine, blue, pink
    Organic pigments, black, brown, blue carbon black, green and red (available from Ciba Geigy & Pfizer)
Antistatic agents
    Armostat 310 (USI chemical)
    Cyastat AS-18 (Argus Corp.)
Flame retardants
    Cresyl diphenyl Phosphate (Mobay Chem)
Wood Particles
    Sawdust or fiber
Silica Powders
    Alumina
Magnetic
    Iron filings
Lubricants
    Hostalube FA-3 (American Hoechst)
    Emerwax (Emery Corp)
    Adagen 58 (Sherex Corp)
Metallic Stearates
    Calcium-Petvac CP11 (LSG-Petrochemicals)

Carbon black is available with particle sizes varying from 5 microns to 250 microns with higher quality carbon black having 0.5 micron size particles. The higher quality carbon black also has more consistency in particle size. Sublayers can be made in accordance with the principles of this invention, which are 0.0003 inch or 2.5 microns.

I claim:

1. An article of multi-layered structure comprising a plastic resin including a multitude of particles dispersed in it, said resin being formed into a plurality of sublayers, each having a thickness on the order of thousandths of an inch or less and the particle size being about equal to the thickness of said sublayer or less to position the particles dispersed in each sublayer therein in close proximity to those dispersed in adjacent sublayers to provide relatively high electrically conducting paths through the particles in said plurality of sublayers.

2. An article in accordance with claim 1 wherein said particles are electrically conducting and constitute between about 25% and 90% of said article by volume.

3. An article in accordance with claim 2 wherein said particles are carbon and have sizes from 0.5 to 250 microns and said sublayers have thicknesses greater than the size of the smaller of said carbon particles.

4. An article in accordance with claim 2 wherein each of said sublayers has a thickness of about 0.001 inch.

5. A laminate structure including a plurality of sublayers each comprising a plastic resin having a multitude of particles dispersed in it, each of said sublayers having a thickness on the order of thousandths of an inch or less, the particle size being about equal to the thickness of said sublayer or less, said sublayers being extruded in a manner to position particles dispersed in each sublayer into close proximity to particles dispersed in adjacent sublayers so as to provide relatively high electrically-conducting paths through the particles in said plurality of sublayers.

6. A laminate structure in accordance with claim 5 wherein said particles are electrically conducting, said structure also including spaced-apart electrical connections.

7. A laminate structure in accordance with claim 6 including three or more of said sublayers.

8. A laminate structure in accordance with claims 5 wherein said particles are magnetic.

9. A laminate structure in accordance with claims 5 wherein said particles are colorants.

10. A laminate structure in accordance with claims 5 wherein said particles are antistatic.

11. A laminate structure in accordance with claims 5 wherein said particles are lubricants.

12. A laminate structure in accordance with claims 5 wherein said particles are flame retardants.

* * * * *